Nov. 10, 1953         J. C. KOENIG         2,658,770
FARM IMPLEMENT HITCH
Filed April 14, 1950
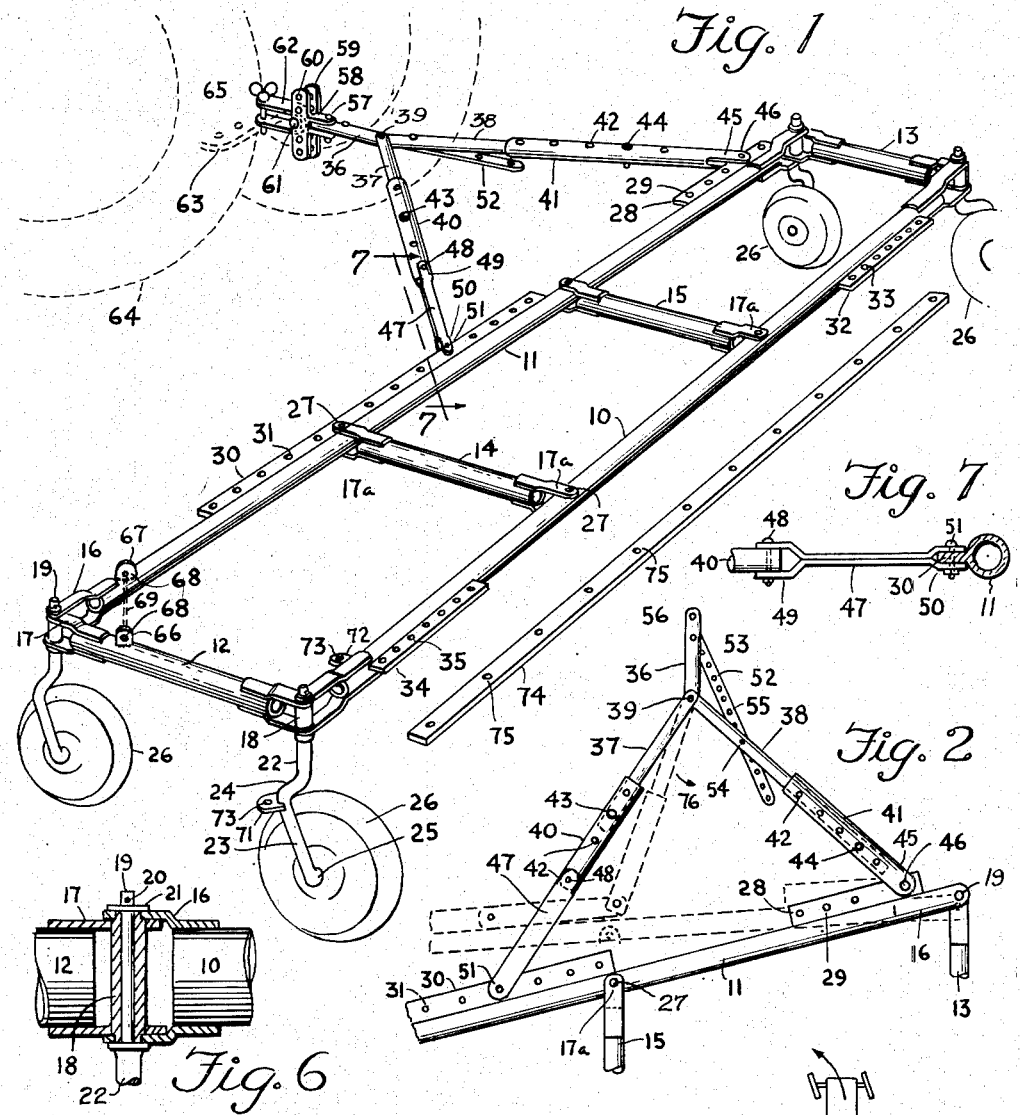
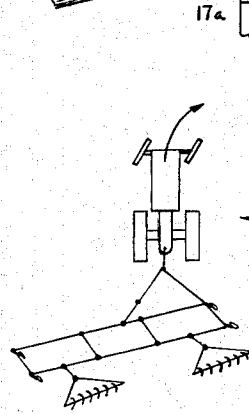
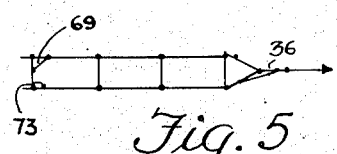
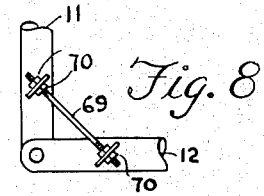
INVENTOR.
JOHN C. KOENIG
BY Sellers & Latta
ATTORNEYS Patented Nov. 10, 1953

2,658,770

UNITED STATES PATENT OFFICE 2,658,770

FARM IMPLEMENT HITCH

John C. Koenig, Van Nuys, Calif.

Application April 14, 1950, Serial No. 155,861

8 Claims. (Cl. 280—33.44)

This invention relates to an improved hitch for drawing a farm implement from a tractor. A general object of the invention is to provide a hitch that is particularly adapted for heavy duty work, making the most efficient use of equipment, labor and time.

A particular object of the invention is to provide a hitch that will equalize the loads of several implements connected by it to a tractor. Another object is to provide a hitch that will provide a relatively light draft, i. e., draw an implement or implements in such a manner as to reduce the load to a minimum.

A further object is to provide a hitch adaptable to quick conversion from field operation to highway transportation and storage; and that will occupy a minimum width of road area when being transported on a highway.

Another object is to provide a hitch that will facilitate turns. That is to say, the invention provides a hitch that will enable a tractor to make a turn on a minimum radius while dragging a plurality of implements.

More specifically, the invention provides a field tested hitch that is especially adapted for pulling two or more implements, e. g., field cultivators or combinations of "two unit connected" implements such as discs, plows, etc. In this connection, the invention provides an extension draw bar for such special purposes.

Another object is to provide a hitch that is adjustable for any width tractor and that may be adjusted to pull at an angle or on the center line of loading, as desired.

Another object is to provide a hitch that will reduce side draft and equalize load. A further object is to provide a hitch that enables more individual adjustment of the implements being pulled.

More particularly, the invention contemplates a hitch that seeks its own equilibrium of draft, thus minimizing side draft and the resultant waste of power.

The invention provides particularly for a sharp left turn, utilizing a knee action or jackknifing drawbar connection.

Another object is to provide a hitch that is readily dismantled for storage. Another object is to provide a hitch that is very strong, rugged and durable.

Another object is to provide a hitch that can be adjusted to equalize the draft of unequal loads. Another object is to provide a hitch that will permit individual adjustment of a single implement without requiring further adjustment thereof when another implement is attached to the hitch.

Other objects will become apparent in the ensuing specifications and appended drawings in which:

Fig. 1 is a perspective view of a hitch embodying my invention;

Fig. 2 is a plan view of the drawbar portion of the hitch;

Fig. 3 is a schematic diagram of the hitch attached to a tractor, illustrating the making of a sharp left turn;

Fig. 4 is a schematic diagram of the hitch attached to a tractor, illustrated making a right turn;

Fig. 5 is a schematic diagram illustrating the transportation of the hitch along the highway;

Fig. 6 is a detail sectional view of one of the corner joints of the hitch;

Fig. 7 is a detail sectional view of a portion of the drawbar connection taken on the line 7—7 of Fig. 1;

Fig. 8 is a detail plan view showing the rigidifying corner connection.

Referring now to the drawings in detail, my improved tractor hitch comprises, in general, a parallelogram shaped frame comprising longitudinal rails 10, 11, cross rails 12, 13, and intermediate cross rails 14, 15. The end cross rails 12, 13 are hinged or pivoted to the longitudinal rails 10, 11 at the corners of the frame. The pivotal connection between the longitudinal rails and the end cross rails is shown in detail in Fig. 6. It comprises pairs of ears 16 secured to the ends of rails 10, 11, and pairs of ears 17 secured to the ends of cross rails 12, 13. These pairs of ears project beyond the ends of the respective rails 10, 11, 12, 13, as shown, ears 16 being spread apart so as to embrace the ears 17. A bearing bushing 18 has its ends mounted in the ears 17 and a king pin 19 is mounted in the ears 16 and journalled within bearing bushing 18, so that the wear may be taken between the pin 19 and the bushing 18 rather than against the ears 16, 17. King pins 19 are secured by cotter pins 20 which are extended therethrough, and by washers 21 which are interposed between the cotter pins and the ears 16.

Each king pin 19 constitutes the shank of a caster shaft 22 which has an arm 23 connected thereto through an offset 24. On the end of the arm 23 is an axle 25 on which is journalled a caster wheel 26. Offset 24 positions arm 23 at one side of shaft 22 sufficiently so that wheel 26 is centered below the axis of shaft 22. Thus the wheel 26 will caster about the hinge pivot at the respective corner of the frame, king pin 19 rotating within bushing 18.

Intermediate cross rails 14, 15 are provided at their ends with forks 17a which are pivotally attached to longitudinal rails 10, 11 by means of bolts 27.

Attached to forward rail 11, adjacent one end thereof, is a relatively short hitch tab 28, which has a series of spaced apertures 29 therein. Attached to forward rail 11 along an intermediate portion thereof, is a relatively long hitch tab 30 having a plurality of apertures 31 arranged in spaced relation from end to end thereof. Tab 30 extends from a point adjacent cross rail 15 to a point substantially half way between cross rails 12 and 14.

Attached to rear rail 10, opposite tab 28, is a tab 32 which has a plurality of spaced apertures 33 therein. Attached to the rear rail 10 near the opposite end thereof is a hitch tab 34 having a plurality of spaced apertures 35 therein. Tabs 32 and 34 function for connecting a pair of implements to the hitch, and tabs 28 and 30 function for connecting the hitch to a drawbar which will now be described.

The drawbar, shown in Figs. 1 and 2, includes a trunk bar 36 and a pair of branch draw bars 38 and 37 pivoted at 39 to the rear end thereof. Branch bars 37, 38, which may be of tubular construction, are telescopically received in extension bars 40, 41 respectively, the latter each having a series of spaced apertures 42 through which connecting pins 43, 44 may be selectively extended. The pins 43 and 44 also extend through openings (not shown) in the inner ends of branch bars 37, 38, so as to tie these bars to the extension bars 40, 41. Extension bar 41 has at its rear end, a bifurcated portion 45 which has a pair of apertures through which a bolt 46 is adapted to be passed, to pin the rear end of extension bar 41 to tab 28, the bolt 46 extending through openings in each of the furcations 45 and through one of the openings 29.

Extension bar 40 forms one leg of a jackknifing link between bar 37 and tab 30, the other leg 47 being pivoted to leg 40 by means of a bolt 48 (see Fig. 7). Leg 47, which may comprise a pair of flat bars, the intermediate portions of which are welded or riveted together, has at its respective ends, clevis portions 49 and 50 which receive respectively the rear end of leg 40 and the tab 30. A bolt 51 provides a pivotal connection between clevis 50 and tab 30. Branch drawbar 38 is connected to trunk bar 36 by a brace 52 one end of which is connected to trunk bar 36 by a bolt 53 and the other end of which is connected to branch bar 38 by a bolt 54. Brace 52 has a series of apertures 55 extending in spaced relationship from end to end thereof, these apertures permitting selective adjustment of the angle between trunk bar 36 and branch bar 38. With the brace connected to both bars 36 and 38, the angle between these two bars is fixed.

An opening 56 at the forward end of trunk drawbar 36 provides for connecting the same, by means of a bolt 57 (Fig. 1) to a hitch clevis 58. Hitch clevis 58 has a pair of vertically extending bars 59 provided with a series of pairs of registering apertures 60 adapted to selectively receive a bolt 61 for connecting the clevis to a yoke 62. Yoke 62 in turn is adapted to be connected to the drawbar tab 63 of a tractor 64 by means of a king pin bolt 65 extended through yoke 62 and through one of a series of openings in tab 63.

The vertically spaced openings 60 of clevis 58 provide for adjusting the clevis (and thus the drawbar 36, etc.) vertically with reference to yoke 62 and thus with reference to the tractor.

The cross rails 12, 13, 14, 15 and their pivotal connections to rails 10 and 11 provide for parallelogram movement of the hitch frame, such movement being desired when implements are being drawn. When the frame is being towed on a highway, however, it is desired to have the frame rigid, and for this purpose I provide, at one corner of the frame, a pair of apertured ears 66 and 67 attached respectively to end rail 12 and forward rail 11 and having apertures 68 through which a tie rod 69 (shown in dotted lines in Fig. 1 and in full lines in Fig. 8) is adapted to be extended, the respective ends of tie rod 69 being threaded and adapted to be secured to ears 66, 67 by nuts 70 engaging both sides of the ears.

When the frame is thus rigidified, it is desirable to fix one of the caster wheels in a position parallel to the longitudinal axis of the frame. For this purpose I provide a pair of horizontal ears 71, 72 secured respectively to arm 23 and rear rail 10, these ears being provided with apertures 73, through which a bolt, not shown, is adapted to be passed. The ears are so positioned as to permit the apertures 73 to be aligned when wheel 26 at this corner of the frame is in alignment with rail 10.

In the operation of the hitch, the drawbar assembly is adjusted to meet the requirements of the particular implement or implements that are to be drawn by the hitch. To equalize the draft between two implements, it may be desirable to adjust the hitch frame laterally with reference to the tractor. This may be accomplished by adjusting the connection between the rear ends of draw bar links 41 and 47 and tabs 28 and 30. A corresponding adjustment may be made in the angle between trunk bar 36 and branch bar 38 by adjusting the connection between the latter and the brace 52.

Where a pair of implements are to be drawn, they will ordinarily be connected to tabs 32, 34. However, in the event it is desired to draw a single implement from the center of the hitch, or to draw a pair of implements with one implement positioned inside the tabs 32, 34, the auxiliary drawbar 74 may be employed. Drawbar 74 has a series of apertures 75 arranged along its length in spaced relation, and the outer apertures may be employed for securing the bar 74 to tabs 32, 34, while the inner apertures 75 may be employed for attaching implements to the bar 74.

As the implements are pulled along a field, any variations in side draft, tending to draw toward one end or the other of the hitch frame, will result in a parallelogram pivotal action in the hitch frame, in which the rear bar 10 shifts longitudinally with reference to the forward bar 11, this parallelogramming action being particularly prominent when the hitch is being dragged around a turn. As shown schematically in Fig. 3, when a left turn is being made, the rear bar 10 will shift to the left, facing forwardly, while when a right turn is being made, as shown in Fig. 4, the rear bar 10 will shift to the right.

Since a left turn is the most common in the cultivating of a field, the invention provides for a particularly sharp turn in this direction. To this end, the knee action linkage 40, 41 is adapted to break at the connecting pivot 48, as indicated in dotted lines in Fig. 2, and in full lines in Fig. 3, so as to shorten the coupling between the tractor and the frame and allow the frame to shift farther to the left and assume a more acute angle to the tractor than would be possible if the linkage 40, 47 were rigid. The breaking of the knee action linkage is forcibly brought about by the levering action of trunk hitch member 36 when left side draft is applied to the forward end thereof instead of a straight ahead pull. Under this side draft, the pull against branch bar 37 is changed to a push, and the pull through the draw bar approaches a straight pull from the tractor to the right half of the hitch frame, through bars 38, 41. There is a resultant tendency to shift the hitch frame longitudinally toward its left end, and the resistance to such movement results in a back load such that pivot 39 tends to move closer to the hitch frame. This is accommodated by the breaking of linkage 40, 47 as indicated by arrow 76 in Fig. 2.

When the hitch is to be drawn or transported over a highway, it is prepared for such transportation by locking the caster wheel at the rear right corner of the frame by inserting a long bolt through ears 71 and 72, and by rigidifying the frame in a rectangular shape by the attachment of tie bolt 69. The hitch is then disconnected from the position of Figs. 1 and 2 and is connected to the right end of the hitch frame by attaching it to the tabs 28 and 32 respectively. This is indicated schematically in Fig. 5, in which the arrow indicates the straight ahead pull of the frame along its longitudinal axis.

In a right turn, as illustrated in Fig. 4, the main pull is through knee action links 40, 47 and these will therefore be aligned.

The advantage of transporting the hitch in this manner is that its total width is less than four feet, so that it does not in any way obstruct the highway.

One of the advantages of the invention is that it permits one implement to be adjusted without a corresponding adjustment of the other implement. The change in draft caused by the adjustment will be automatically compensated for by the parallelogramming action of the frame. Another advantage of the parallelogramming action is the lateral shift of the implements toward the center of a turn, which facilitates turning and shortens the radius of turn. Other advantages are: ease of manufacture and maintenance. The rails 10, 11 may be made in one drill jig, the rails 12, 13, 14, 15 in another, thus providing for the major parts with the use of only two jigs. There are only four major wear points (at bushings 18). This lubrication is a simple operation. Disassembly for repair is likewise easily and quickly accomplished. The tractor pull can be applied at various points along the length of the parallelogram frame. The hitch can be quickly converted for road transportation in a manner to occupy only four feet of road width.

I claim:

1. A tractor to implement hitch comprising a pair of longitudinal rails, each extending continuously and rigidly throughout the transverse length of the hitch and a plurality of laterally spaced cross rails each pivotally connected at respective ends to the respective longitudinal rails to form a frame of parallelogram shape having four corners, a plurality of caster wheels each having a castering connection to said frame at a respective corner, means for connecting one or more implements to the rear longitudinal rail, and a draw bar unit extending forwardly from said forward longitudinal rail for pivotally connecting the same to a tractor at a point forwardly of said forward rail, said draw bar unit including a trunk draw bar and means connecting the same to said forward rail in a manner to maintain a fixed angular relation between said draw bar and forward rail during normal straight ahead draft, said rear rail and cross rails being free of any connection with each other or with said forward rail or drawbar means, other than the pivotal connections between the ends of the respective cross rails and the forward and rear rails, whereby said rear rail may shift transversely with reference to said forward rail and to the line of draft, in response to lateral components of load developed during turns, said connecting means comprising a pair of branch drawbars both connected to said trunk drawbar at their forward ends, said branch drawbars diverging rearwardly so as to define with said trunk drawbar a Y formation and being attached to said forward rail at their rear ends; and brace means connecting one of said branch drawbars to said trunk drawbar in fixed obtuse angular relation thereto; the other branch drawbar comprising two sections pivoted together in end-to-end relation and adapted to jackknife during a turn toward said other branch drawbar.

2. A hitch as defined in claim 1, wherein said longitudinal and cross rails are connected by clevises, and king pins connecting the corner clevises, said king pins being extended to form castering shafts for said wheels.

3. A hitch as defined in claim 1, wherein said longitudinal and cross rails are connected by clevises, and king pins connecting the corner clevises, said king pins being extended to form castering shafts for said wheels; and wherein there are four of said cross rails, each of tubular form with bars welded to the ends thereof and extended therebeyond to form said clevises, the clevises of the two intermediate rails embracing and being pivoted directly to said longitudinal rails.

4. A hitch as defined in claim 1, wherein said frame is provided with means for rigidifying one of said caster wheels in a position in alignment with a longitudinal rail of said frame, and is provided with means for rigidifying the frame itself to prevent parallelogramming movement, and wherein said drawbar is adapted to be detached from the forward rail of said frame and attached to an end of said frame opposite the end where said caster wheel is rigidified, for transporting said frame in a path parallel to its longitudinal axis along a highway.

5. A tractor to implement hitch comprising a relatively long and narrow frame of parallelogram shape comprising relatively long forward and rear rails each extending uninterruptedly and rigidly throughout the transverse length of the hitch, and a pair of laterally spaced relatively short cross rails; corner pivots connecting each cross rail at its respective ends to the respective forward and rear rails at the four corners of said frame; castering roller supports pivotally connected to and supporting said four corners; implement hitching means extending along the rear side of said rear rail, having means for pivotal hitching of a plurality of implements thereto; and a drawbar unit of Y formation including a trunk bar having means at its forward end for attaching the same to a tractor and a pair of branch bars one rigidly connected to the rear end of said trunk bar in fixed obtuse-angular relation thereto and the other pivotally attached to said rear end of the trunk bar, said branch bars diverging rearwardly, said one branch bar being attached to said forward rail near one end of said frame, said other branch bar being pivotally attached to said forward rail substantially midway between the ends of said frame, whereby the area of attachment of said drawbar unit to the frame embraces approximately one end half of the frame, leaving the other end half of the frame projecting laterally from the drawbar unit; said other branch bar comprising a pair of bar sections pivotally joined one to the other and adapted, in response to turning movement of said trunk bar, to jackknife so as to allow said other end half of the frame to approach the drawbar during a turn toward said other end half; said cross rails and rear rail being free of any connection with the forward rail or drawbar unit or each other except the pivots connecting the ends of the cross rails to the forward and rear rails, whereby said rear rail and hitching means are free at all times to shift laterally with respect to the forward rail and to the line of draft.

6. A hitch as defined in claim 5, wherein said forward rail is provided with tabs with multiple apertures extending longitudinally thereof, for attachment of the rear ends of said branch bars to said forward rail at selected positions of adjustment longitudinally thereof.

7. A hitch as defined in claim 5, wherein said corner pivots comprise yokes secured to respective ends of the respective rails, extending into interleaved relation, and having registering apertures, said roller supports each having a shank extending through a respective series of said registering apertures to serve as a pivot trunnion attaching the interleaved yokes together.

8. A hitch as defined in claim 5, wherein the rigidifying connection between said trunk bar and said one branch bar comprises a brace having a plurality of apertures therein, and a securing element carried by said one branch bar and selectively receivable in a number of said apertures for varying the angular relation between said trunk bar and said one branch bar.

JOHN C. KOENIG.

References Cited in the file of this patent

UNITED STATES PATENTS

| Number | Name | Date |
|---|---|---|
| 802,728 | Amos | Oct. 24, 1905 |
| 1,088,568 | Hammell | Feb. 24, 1914 |
| 1,319,235 | Messersmith | Oct. 21, 1919 |
| 1,497,051 | Wilson | June 10, 1924 |
| 1,636,802 | Bozard | July 26, 1927 |
| 1,700,009 | Willner Sr. | Jan. 22, 1929 |
| 1,740,751 | Smith | Dec. 24, 1929 |
| 2,401,881 | Petsche | June 11, 1946 |

FOREIGN PATENTS

| Number | Country | Date |
|---|---|---|
| 132,550 | Great Britain | Sept. 25, 1919 |
| 411,757 | Germany | Apr. 1, 1925 |